(12) United States Patent
Yun et al.

(10) Patent No.: US 8,791,886 B2
(45) Date of Patent: Jul. 29, 2014

(54) DC-DC CONVERTER AND ORGANIC LIGHT EMITTING DISPLAY DEVICE INCLUDING THE SAME

(75) Inventors: Su-Yeon Yun, Yongin (KR); Sung-Cheon Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 811 days.

(21) Appl. No.: 12/855,654

(22) Filed: Aug. 12, 2010

(65) Prior Publication Data

US 2011/0187697 A1 Aug. 4, 2011

(30) Foreign Application Priority Data

Feb. 3, 2010 (KR) ........................ 10-2010-0010000

(51) Int. Cl.
*G09G 3/30* (2006.01)
*G06F 3/038* (2013.01)
*G09G 5/00* (2006.01)

(52) U.S. Cl.
CPC ............ *G09G 3/30* (2013.01); *G09G 2330/021* (2013.01); *G09G 2330/028* (2013.01)
USPC .......................................... 345/77; 345/211

(58) Field of Classification Search
CPC ..... G09G 3/30; G09G 1/005; G09G 2330/00; G09G 2330/021; G09G 2300/028; H02M 2001/009
USPC ................. 323/273, 275, 282, 283, 285, 351; 363/59, 60; 713/300–340; 345/211–213; 315/160–176
See application file for complete search history.

(56) References Cited

U.S. PATENT DOCUMENTS

| 5,747,942 | A  | * | 5/1998 | Ranganath | ..................... 315/224 |
| 2006/0066531 | A1 | * | 3/2006 | Park et al. | ........................ 345/76 |
| 2006/0164366 | A1 | * | 7/2006 | Yu et al. | ........................... 345/98 |
| 2008/0246702 | A1 | * | 10/2008 | Lee et al. | ........................ 345/77 |
| 2009/0224602 | A1 | * | 9/2009 | Tsukamoto | ..................... 307/31 |

FOREIGN PATENT DOCUMENTS

| JP | 2002-330581 | 11/2002 |
| JP | 2004-328834 | 11/2004 |
| JP | 2007-020379 | 1/2007 |
| JP | 2009-139935 | 6/2009 |

(Continued)

OTHER PUBLICATIONS

KIPO Office Action dated Aug. 29, 2011 for KR Application No. 10-2010-0010000 (3 pages).

(Continued)

*Primary Examiner* — Dwayne Bost
*Assistant Examiner* — Christopher Kohlman
(74) *Attorney, Agent, or Firm* — Christie, Parker & Hale, LLP

(57) ABSTRACT

An organic light emitting display device includes a DC-DC converter that is capable of reducing power consumption by increasing efficiency. The DC-DC converter includes: a variable resistor; an oscillator configured to output a frequency control signal having a frequency corresponding to a resistance value of the variable resistor; a booster configured to receive the control signal and to output a first power by switching an input voltage in accordance with the control signal; and an inverter configured to receive the control signal and to generate a second power by switching and inverting the input voltage in accordance with the control signal.

11 Claims, 3 Drawing Sheets

(56) References Cited

FOREIGN PATENT DOCUMENTS

| KR | 10-20040066292 A | 7/2004 |
| KR | 10-2005-0023852 A | 3/2005 |
| KR | 10-20050032416 A | 4/2005 |
| KR | 10-2008-0090879 A | 10/2008 |

OTHER PUBLICATIONS

Japanese Office action dated Jan. 24, 2012, issued in Japanese Patent Application No. 2010-109495, which claims priority of corresponding Korean priority application No. 10-2010-0010000, 5 pages.

KIPO Office action dated Dec. 1, 2011 for the corresponding Korean priority application No. 10-2010-0010000, 1 page.

* cited by examiner

DC-DC CONVERTER AND ORGANIC LIGHT EMITTING DISPLAY DEVICE INCLUDING THE SAME

CROSS-REFERENCE TO RELATED APPLICATION

This application claims priority to and the benefit of Korean Patent Application No. 10-2010-0010000, filed on Feb. 3, 2010, in the Korean Intellectual Property Office, the entire content of which is incorporated herein by reference.

BACKGROUND

1. Field

An embodiment of the present invention relates to a DC-DC converter and an organic light emitting display device including the same.

2. Description of Related Art

In recent years, various flat panel displays having reduced weight and volume to address disadvantages of a cathode ray tube have been developed. Examples of the flat panel displays include a liquid crystal display, a field emission display, a plasma display panel, an organic light emitting display, etc.

Among the flat panel displays, the organic light emitting display displays an image by using organic light emitting diodes (OLEDs) generating light by the recombination of electrons and holes.

An organic light emitting diode includes an anode electrode, a cathode electrode, and a light emitting layer positioned between the anode electrode and the cathode electrode and when current flows from the anode electrode to the cathode electrode, the organic light emitting diode emits light.

The organic light emitting display is used in various fields such as for PDAs, MP3 players, etc. in addition to cellular phones, such that the market for organic light emitting displays is remarkably expanding due to its various qualities such as excellent color reproduction and thin thickness.

When the organic light emitting display is used in cellular phones, PDAs, MP3 players, etc., the organic light emitting display receives power from a battery. However, when a large amount of current is consumed in the organic light emitting display, the cellular phone, the PDA, the MP3 player, etc. cannot be used for a long time, because the battery may frequently need to be exchanged or recharged. Accordingly, it is desirable to reduce the power consumption in the organic light emitting display.

SUMMARY

Accordingly, an embodiment of the present invention provides a DC-DC converter and an organic light emitting display device including the same capable of reducing power consumption by increasing efficiency.

According to one embodiment of the present invention, a DC-DC converter includes: a variable resistor; an oscillator configured to output a control signal having a frequency corresponding to a resistance value of the variable resistor; a booster configured to receive the control signal and to output a first power by switching an input voltage in accordance with the control signal; and an inverter configured to receive the control signal and to generate a second power by switching and inverting the input voltage in accordance with the control signal.

According to another embodiment of the present invention, an organic light emitting display device includes: a display unit configured to display an image corresponding to a data signal, a scan signal, a first power, and a second power; a data driver configured to generate the data signal and to transmit the data signal to the display unit; a scan driver configured to generate the scan signal and to transmit the scan signal to the display unit; and a DC-DC converter configured to generate the first power and the second power and to transmit the first power and the second power to the display unit, wherein the DC-DC converter includes: a variable resistor, an oscillator configured to output a control signal having a frequency corresponding to a resistance value of the variable resistor; a booster configured to receive the control signal and to output the first power by switching an input voltage in accordance with the control signal, and an inverter configured to receive the control signal and to generate the second power by switching and inverting the input voltage in accordance with the control signal.

According to an embodiment of the present invention, a DC-DC converter and an organic light emitting display device including the same can increase the efficiency of the organic light emitting display by providing a DC-DC converter capable of adjusting its output voltage. In particular, it is possible to increase the efficiency by adjusting a frequency to reduce an output voltage difference (and hence reduce output current) when displaying a low gray level image.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION

Figure 1:
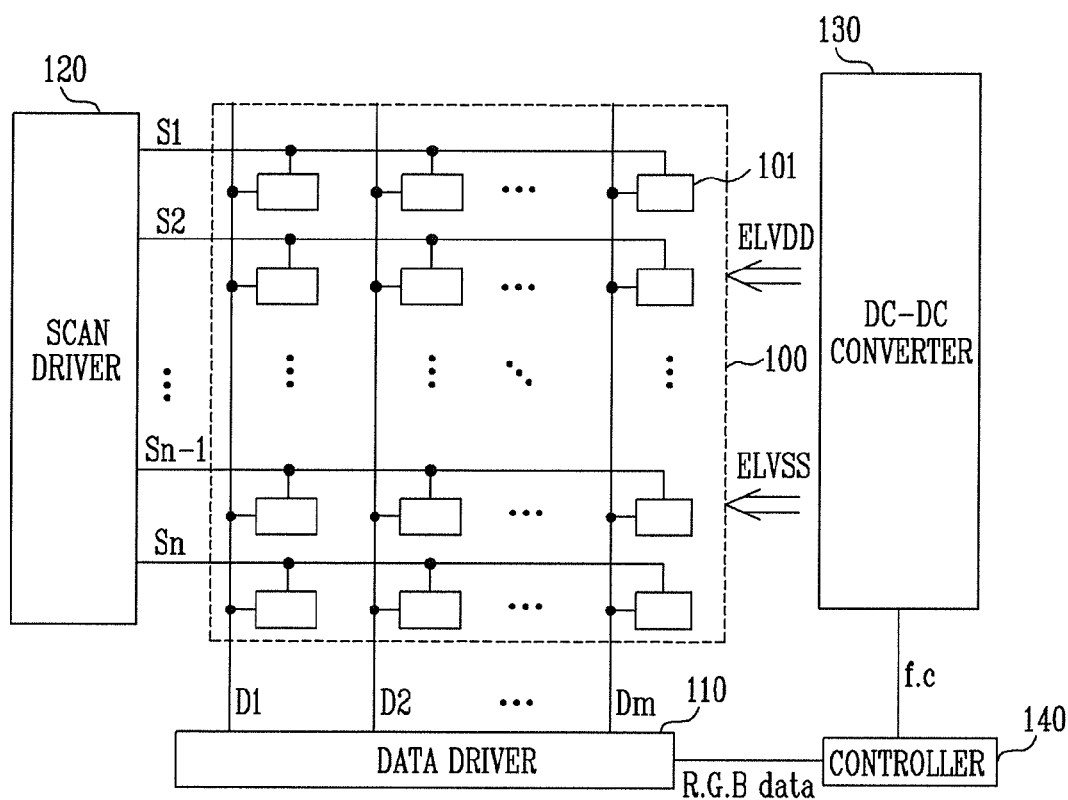
FIG. 1 is a schematic diagram of an organic light emitting display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or may be indirectly on the another element with one or more intervening elements interposed therebetween. Also, when an element is referred to as being "coupled to" another element, it may be directly coupled to the another element or may be indirectly coupled to the another element with one or more intervening elements interposed therebetween. Hereinafter, like reference numerals refer to like elements.

Hereinafter, exemplary embodiments of the present invention will be described with reference to the accompanying drawings.

FIG. 1 is a schematic diagram of an organic light emitting display device according to one embodiment of the present invention. Referring to FIG. 1, an organic light emitting display device according to one embodiment of the present invention includes a display unit 100, a data driver 110, a scan driver 120, a DC-DC converter 130, and a controller 140.

The display unit 100 includes a plurality of pixels 101 and each pixel 101 includes an organic light emitting diode (OLED) emitting light corresponding to the magnitude of a current flowing through the OLED. In addition, the display unit 100 includes a plurality of scan lines S1, S2, ..., Sn−1, Sn extending in a row direction to transmit scan signals and a plurality of data lines D1, D2, ..., Dm−1, Dm extending in a column direction to transmit data signals. In addition, the display unit 100 receives a first power from a first power source ELVDD and a second power from a second power source ELVSS from the outside.

The data driver 110 generates the data signals by receiving RGB video data having red, blue, and green components. In addition, the data driver 110 is coupled to data lines D1, D2, ..., Dm−1, Dm of the display unit 100 to apply the generated data signals to the display unit 100.

The scan driver 120 transmits the scan signals to rows of the display unit 100. The scan driver 120 is coupled to scan lines S1, S2, ..., Sn−1, Sn to apply the generated scan signals to the display unit 100. The data signals outputted from the data driver 110 are transmitted to the pixels 101 to which the scan signals are transmitted, such that driving current is generated in the pixels 101 to flow through the organic light emitting diodes.

The DC-DC converter 130 transmits the first power and the second power to the display unit 100 and transmits a driving voltage from a driving voltage source VDD to the data driver 110, the scan driver 120, etc. The DC-DC converter 130 boosts and/or inverts voltage inputted from a battery to generate the first power and the second power. The DC-DC converter 130 generates voltages of the first power and the second power using a switching operation. The switching operation is performed in accordance with the magnitude of the current that flows through the display unit.

The controller 140 outputs a frequency control signal f.c to control the DC-DC converter 130. The controller 140 determines the magnitude of the driving current that flows through the display unit 100 by using a video signal. For example, the controller 140 determines the magnitude of the driving current that flows through the display unit 100 by summing up gray levels of video signals inputted into one or more sections of one frame. In addition, the controller 140 increases the efficiency of the DC-DC converter 130 by controlling the voltage of the second power source ELVSS in accordance with the magnitude of the driving current.

Figure 2:
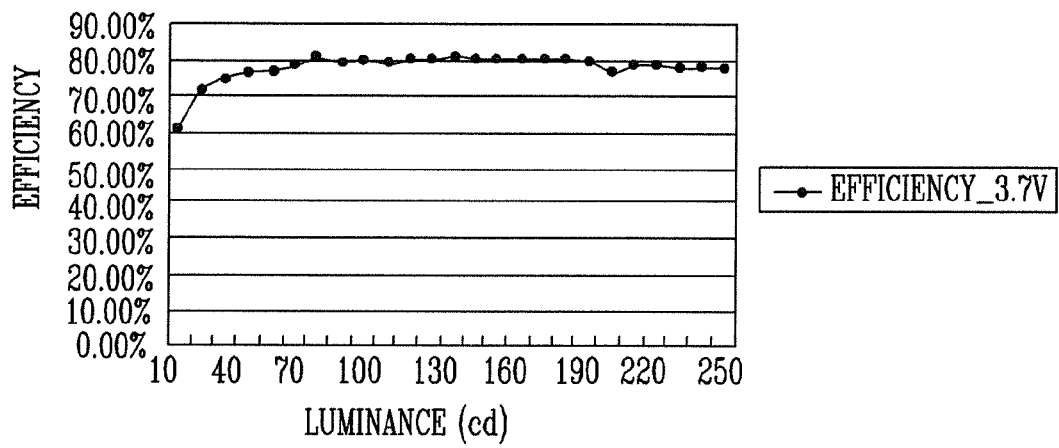
FIG. 2 is a graph showing the efficiency of a DC-DC converter depending on the magnitude of the current that flows through a display unit, based on the luminance of the display unit.

FIG. 2 is a graph showing an efficiency of a DC-DC converter depending on the magnitude of the current that flows through a display unit. The X-axis of the graph represents the luminance (which corresponds to the current) of the display unit 100 and a Y-axis represents efficiency. In addition, an absolute value of in this graph, the voltage of the second power source ELVSS is fixed at 3.7V. Referring to FIG. 2, when the luminance of the display unit 100 is 10 cd, the efficiency of the DC-DC converter 130 is approximately 60% and when the luminance is 70 cd or more, the efficiency of DC-DC converter 130 is 80% or more. That is, if the luminance of the display unit 100 is low, the efficiency of the pixel unit is low.

The organic light emitting display device emits light with high luminance or low luminance corresponding to the magnitude of the current that flows through the organic light emitting diode due to characteristics of the OLEDs. Accordingly, if the luminance of the display unit 100 is high, it may be determined that the magnitude of the current is high and if the luminance of the display unit 100 is low, it may be determined that the magnitude of the current is low.

Therefore, in general, when an image having a low gray level is displayed on the display unit 100, the magnitude of the driving current that flows through the display unit 100 may be small, so that it is possible to increase the efficiency of the organic light emitting display device by controlling the voltage of the second power source ELVSS. For example, the voltage of the second power may be increased such that the voltage difference between the first power and the second power decreases, thereby reducing the voltage applied to the pixels 101 to increase the efficiency of the display unit 100.

Figure 3:
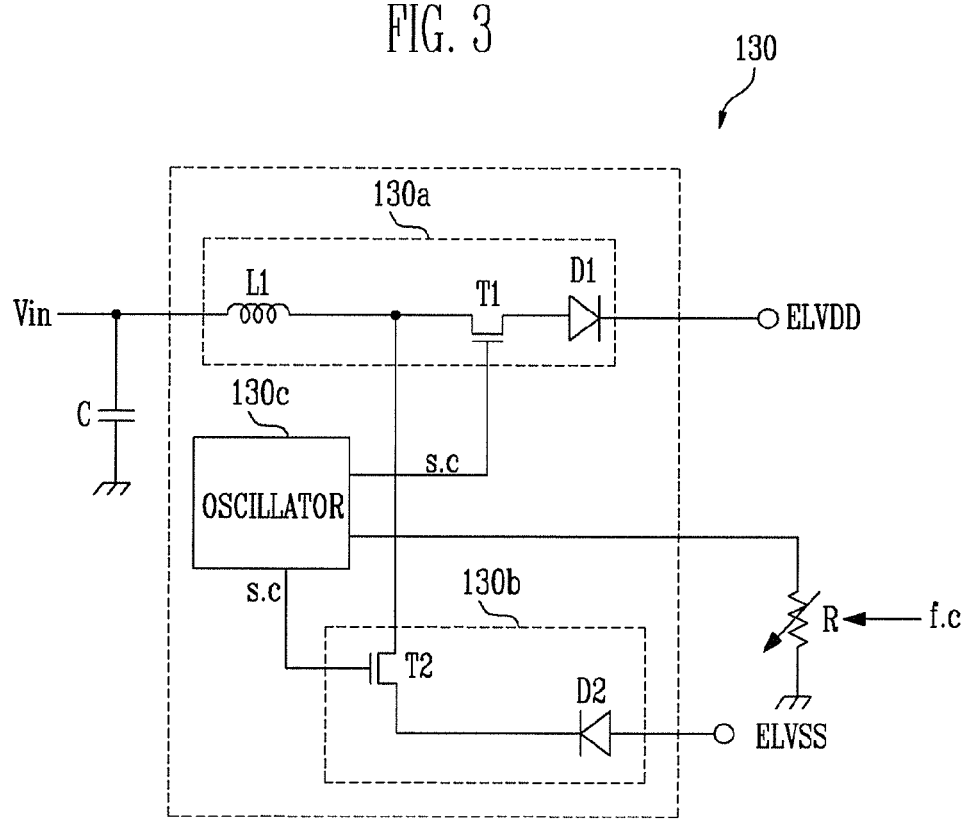
FIG. 3 is a schematic circuit diagram of a DC-DC converter shown in FIG. 1.

FIG. 3 is a schematic circuit diagram of a DC-DC converter shown in FIG. 1. Referring to FIG. 3, the DC-DC converter 130 includes a booster 130a for generating the first power and an inverter 130b for generating the second power. Further, the DC-DC converter 130 includes a coil (or inductor) L1, first and second transistors T1 and T2, an oscillator 130c, and a variable resistor R. In the booster 130a, the first transistor T1 repetitively performs turn-on and turn-off operations by the operation of the oscillator 130c. As a result, electromotive force is formed in the coil L1, such that a voltage higher than an input power Vin is generated in the booster 130a.

In the inverter 130b, the second transistor T2 repetitively performs the turn-on and turn-off operations by the operation of the oscillator 130c. As a result, by inverting the generated electromotive force and input voltage Vin formed in the coil L1, the inverter 130b generates the second power having a voltage lower than the voltage of the first power.

The oscillator 130c alternately applies positive and negative voltages to the first and second transistors T1 and T2 to control the first and second transistors T1 and T2 to perform the turn-on and turn-off operations. That is, the oscillator 130c generates a switching control signal s.c having a frequency to turn the first and second transistors T1 and T2 on and off. In addition, the oscillator 130c controls the electromotive force generated in the coil L1 by controlling a turn-on/turn-off time (or duty cycle) by controlling the frequency of the switching control signal s.c.

The variable resistor receives the frequency control signal f.c. from the controller 140, such that a resistance value is controlled and the oscillator controls the frequency of the switching control signal s.c in accordance with the resistance value of the variable resistor. For example, as the resistance value of the variable resistor increases, the frequency of the switching control signal s.c. increases.

Figure 4:
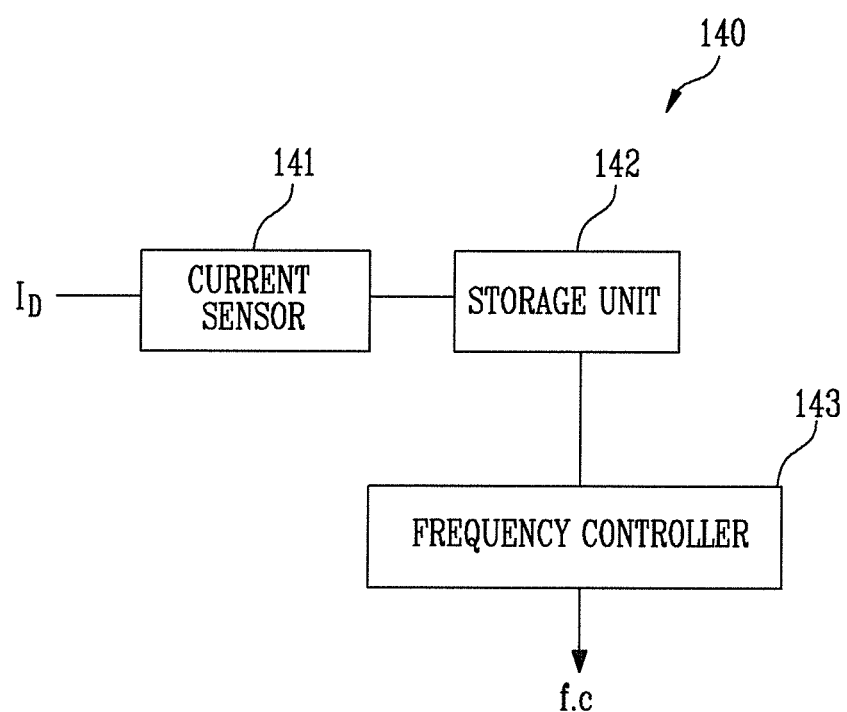
FIG. 4 is a block diagram of a controller adopted in an organic light emitting display device shown in FIG. 1.

FIG. 4 is a schematic diagram showing the structure of a controller adopted in an organic light emitting display device shown in FIG. 1. Referring to FIG. 4, the controller 140 includes a current sensor 141, a storage unit 142, and a frequency controller 143.

The current sensor 141 senses the magnitude of the driving current $I_D$ that flows through the display unit 100 by using a video signal inputted from the outside. In the organic light emitting display device, since the driving current $I_D$ flows to correspond to the luminance in each pixel, when many pixels have high luminance, the driving current $I_D$ consumed is large and when many pixels have low luminance, the driving current $I_D$ consumed is small. The current sensor 141 determines the magnitude of the driving current $I_D$ that flows through the display unit 100 for each frame based on the characteristics of the organic light emitting display device.

The storage unit 142 stores the frequency of the switching control signal s.c generated in the oscillator 130c of the DC-DC converter 130 to correspond to the magnitude of the driving current $I_D$. For example, after a reference magnitude of the driving current $I_D$ is determined, in the case when the magnitude of the driving current $I_D$ is the reference magnitude, an oscillation frequency of the oscillator 130c is set to 1 MHz and when the magnitude of the driving current $I_D$ decreases, the frequency decreases stepwise by 0.2 MHz and when the magnitude of the driving current $I_D$ increases, the frequency increases stepwise by 0.2 MHz. In one embodiment, the frequency of the switching control signal which can be generated in the oscillator 130c can be changed within the range of 0.4 MHz to 1.6 MHz to correspond to the magnitude of the driving current $I_D$.

The frequency controller 143 outputs the frequency control signal f.c according to the magnitude of the driving current $I_D$ sensed by the current sensor 141 and the frequency value stored in the storage unit 142. In addition, the oscillator 130c determines the frequency of the switching control signal s.c by the frequency control signal f.c. The voltage of the second power source ELVSS is controlled based on the magnitude of the driving current $I_D$ by the oscillator 130c, thereby increasing the efficiency of the organic light emitting display device.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter, comprising:
a variable resistor;
an oscillator configured to output a control signal having a frequency corresponding to a resistance value of the variable resistor;
a booster configured to receive the control signal and to output a first power by switching an input voltage in accordance with the control signal;
an inverter configured to receive the control signal and to generate a second power by switching and inverting the input voltage in accordance with the control signal; and
a controller configured to control the resistance value of the variable resistor, the controller comprising a current sensor configured to sense a magnitude of a driving current.

2. The DC-DC converter of claim 1, wherein the controller further includes:
a storage unit configured to store a frequency value corresponding to the magnitude of the driving current sensed by the current sensor; and
a frequency controller configured to control the resistance value of the variable resistor in accordance with the frequency value stored in the storage unit.

3. The DC-DC converter of claim 2, wherein the frequency value stored in the storage unit is in the range of 0.6 MHz to 1.4 MHz.

4. The DC-DC converter of claim 2, wherein the current sensor is configured to sense the magnitude of the driving current that flows during each frame.

5. The DC-DC converter of claim 1, wherein the oscillator is configured to decrease the frequency of the control signal when the resistance value of the variable resistor increases.

6. An organic light emitting display device, comprising:
a display unit configured to display an image corresponding to a data signal, a scan signal, a first power, and a second power;
a data driver configured to generate the data signal and to transmit the data signal to the display unit;
a scan driver configured to generate the scan signal and to transmit the scan signal to the display unit; and
a DC-DC converter configured to generate the first power and the second power and to transmit the first power and the second power to the display unit,
wherein the DC-DC converter comprises:
a variable resistor;
an oscillator configured to output a control signal having a frequency corresponding to a resistance value of the variable resistor;
a booster configured to receive the control signal and to output the first power by switching an input voltage in accordance with the control signal;
an inverter configured to receive the control signal and to generate the second power by switching and inverting the input voltage in accordance with the control signal; and
a controller configured to control the resistance value of the variable resistor, the controller comprising a current sensor configured to sense a magnitude of a driving current.

7. The organic light emitting display device of claim 6, wherein the controller further comprises:
a storage unit configured to store a frequency value corresponding to the magnitude of the driving current sensed by the current sensor; and
a frequency controller configured to control the resistance value of the variable resistor in accordance with the frequency value stored in the storage unit.

8. The organic light emitting display device of claim 7, wherein the frequency value stored in the storage unit is in the range of 0.6 MHz to 1.4 MHz.

9. The organic light emitting display device of claim 7, wherein the current sensor is configured to sense the magnitude of the driving current that flows during each frame.

10. The organic light emitting display device of claim 6, wherein the oscillator is configured to decrease the frequency of the control signal when the resistance value of the variable resistor increases.

11. A DC-DC converter, comprising:
a variable resistor;
an oscillator configured to output a control signal having a frequency corresponding to a resistance value of the variable resistor;
a booster configured to receive the control signal and to output a first power by switching an input voltage in accordance with the control signal; and
an inverter configured to receive the control signal and to generate a second power by switching and inverting the input voltage in accordance with the control signal, the inverter comprising a switch coupled in series between a coil and a diode.

* * * * *